June 24, 1924.
H. L. TANNER
COMPENSATED GYROSCOPIC COMPASS
Filed Feb. 17, 1919
1,499,322
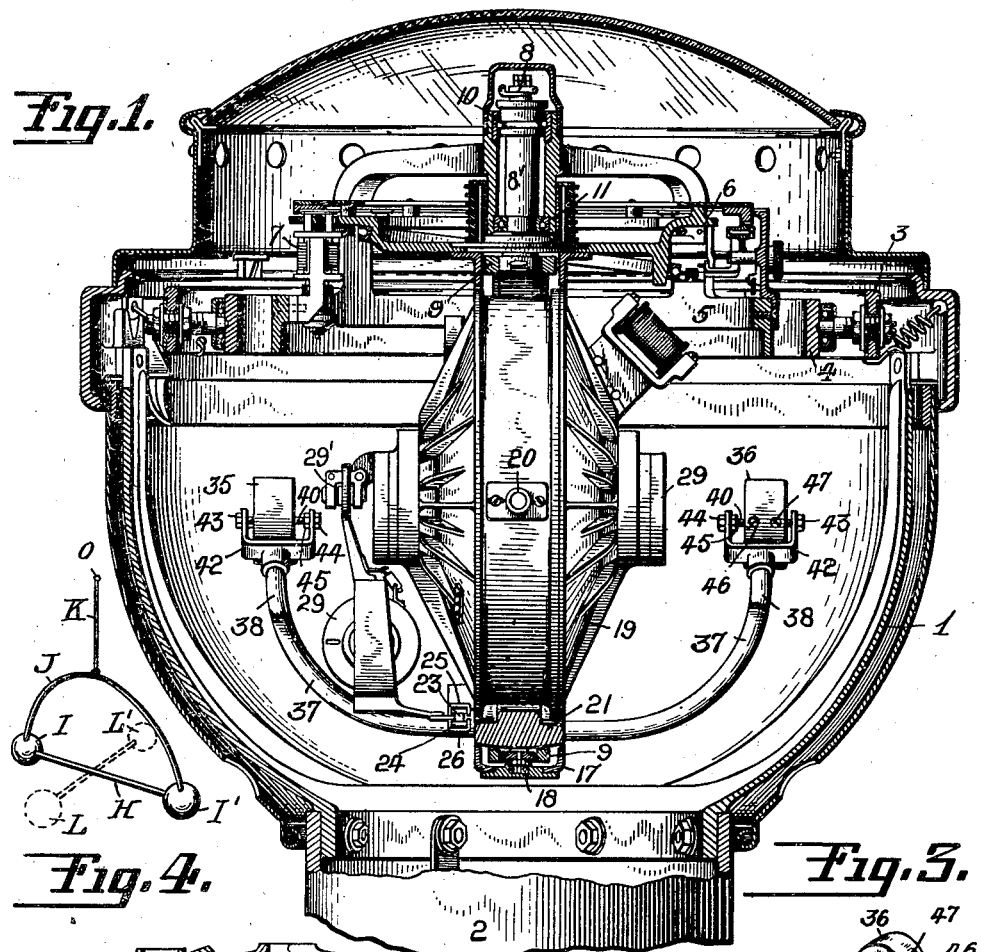
INVENTOR
HARRY L. TANNER
BY Herbert H. Thompson
his ATTORNEY Patented June 24, 1924.

1,499,322

UNITED STATES PATENT OFFICE.

HARRY L. TANNER, OF BROOKLYN, NEW YORK, ASSIGNOR TO THE SPERRY GYROSCOPE COMPANY, OF BROOKLYN, NEW YORK, A CORPORATION OF NEW YORK.

COMPENSATED GYROSCOPIC COMPASS.

Application filed February 17, 1919. Serial No. 277,635.

*To all whom it may concern:*

Be it known that I, HARRY L. TANNER, a citizen of the United States of America, residing at 1144 East 19th Street, Brooklyn, in the county of Kings and State of New York, have invented certain new and useful Improvements in Compensated Gyroscopic Compasses, of which the following is a specification.

This invention relates to gyroscopic compasses and especially to the type of gyro compass in which the directive element is not stabilized in all directions. It has been found that in such compasses errors arise when the ship on which it is mounted is rolling on an intercardinal course. The said errors may be said to be due to two different causes, to overcome the first of which it is the object of the invention described in my joint Letters Patent with Hannibal C. Ford, No. 1,273,799, dated July 23, 1918. The other source of error may be said to be due to centrifugal forces arising on the rolling and pitching in intercardinal planes, which it is the object of this invention to overcome without the disadvantage of employing heavy auxiliary gyroscopes for stabilizing the apparatus.

Referring to the drawings in which what is now considered the preferred form of the invention is shown:

Fig. 1 is a west elevation, partly in section, of a gyroscopic compass of the Sperry type having my invention applied thereto.

Fig. 2 is a south elevation of the rotor casing and attached parts, including the supporting rings, etc. with all parts thereof in section.

Fig. 3 is a detail of the compensating weights constituting the present embodiment of the invention.

Fig. 4 is a diagram illustrating the theory of the invention.

Referring to Fig. 4, this figure represents a weightless rod H connecting two weights I and I' and supported by a loop J and thread K from the pivot O. If the said weights are swung about the pivot O in the plane of the loop or at right angles thereto no torque will be exerted about the axis of the thread. If however, the weights are swung in the plane at say 45° to the plane of the loop a torque will be exerted about the thread in such a direction as to turn the rod H and weights I, I' into the plane of oscillation. A similar phenomenon presents itself to an even more marked degree in the gyro compass as will hereinafter be explained. If, however, masses L, L' are positioned at right angles to I, I' the torque produced thereby would balance the torque due to I, I' and hence no deflecting torque would be produced.

I have chosen for illustrating the invention a standard "Sperry" compass of the "Battleship" type, although it will readily be understood that the invention is equally applicable to all types of gyro-compass.

Referring now to the compass proper. The compass is shown as mounted within a bowl 1 supported upon the standard 2 and suspended within gimbal rings 3 and 4 and a spider or main frame 5 within the bowl. The frame 5 rotatably supports in bearings 10 and 11, what is known in the "Sperry" compass as a follow-up element 6 which is rotated by means of a motor 7 actuated by reversing contacts (not shown) on the sensitive and follow-up elements respectively. The sensitive element which includes the gyroscope itself is suspended from bearing 8 supported by a hollow stem 8' on the follow-up element. The sensitive element comprises a vertical ring 9 which is directly suspended from bearing 8. The follow-up element is also provided with a ring 17 connected to stem 8' and which surrounds the aforesaid vertical ring and provides a lower guide bearing 18 therefor. The rotor casing proper 19 is supported on horizontal pivots 20 on the vertical ring preferably at or near its center of gravity. Pendulosity is imparted to the casing in the embodiment shown by means of a yielding connection between the gyroscope and the follow-up frame comprising a heavy weight or bail 21 which is suspended from the follow-up ring 17 on bearings 22 preferably in line with bearings 20 and is connected to the casing by a floating connection 23. Such connection in this instance comprises a pair of rollers 24 one of which engages in a track 25 on a casing and the other in a track 26 secured to the bail. Said rollers are preferably secured to a pendulum having a long period in the E—W plane such as a small auxiliary gyroscopic pendulum 29 suspended at 29' from casing 19. Within the casing 19, the gyro rotor 28 is journalled on horizontal axes at right angles to the axis 20. The rotor is preferably electrically driven, forming the rotor of an induction motor the stator 31 of which is secured to the interior of the casing.

From the foregoing description it is apparent that the sensitive element including the vertical ring, gyro casing, rotor and attached parts comprise a pendulum oscillatable about the axes of the gimbal rings. The pendulum is peculiar, however, when the gyroscope is running in that the entire rotor casing and rotor are stabilized about the axis 20 while about an axis at right angles thereto the parts are free to swing excepting only the rotor, the spinning axis of which is parallel thereto. The effect of stabilizing the casing about axis 20 is to render substantially ineffective the mass of the casing in the N—S plane. In other words, referring to Fig. 4, if masses I, I' and L, L' were stabilized about axis I, I', masses L, L' would have little or no effect and the torque due to I, I' would predominate and cause deflection. Another way of looking at this is to consider that the stabilization of the casing about axis 20 in effect transfers the entire weight of the casing to the pivots 20 where the casing is supported in the vertical ring 9. From this it follows first that a marked torque will be exerted around the vertical axis, when the compass is oscillated in intercardinal planes, second that any addition to the weight of the casing in the N—S plane will be ineffectual to overcome this torque, and third that to compensate for this torque much larger masses would have to be placed on either side of the axis 20 than would be necessary to merely equalize the moments of inertia of the casing and attached parts if the casing were not stabilized. It also follows that the rotor itself may be neglected since it is free about both horizontal axes, i. e. its spinning axis and axis 20.

To overcome these difficulties I prefer to secure to the vertical ring 9 a plurality of masses 35 and 36 which are preferably suspended in line with the center of gravity of the casing and which lie beyond the confines of the case in the N—S direction. Said masses as shown are preferably secured to curved bars 37 and 38 which extend underneath the compass and are provided with lugs 39 and 40. Said lugs extend through openings 41 and 42 in the follow-up ring and are secured firmly to the vertical ring. The weight of the masses and their distance from the center of the casing is so adjusted that the couple exerted thereby about the vertical axis on swinging will balance the opposite couple due to the vertical ring and stabilized casing. As above pointed out this means that larger masses, or greater lever arms for the masses must be used than if the casing were not stabilized in the E—W plane.

In order that the masses may be accurately positioned so that a perfect balance may be secured about both horizontal axes I prefer to mount each of them upon a threaded rod or bolt 41' which is rotatably mounted in a bracket 42' secured to one end of each of rods 37 and 38. The said bolt may be readily located by turning the head 43 and may be locked in any position by means of lock nuts 44 and 45. Preferably also the threaded bore in the members 35 and 36 through which the rod 41' extends is not concentric or through the center of gravity but to one side thereof. Also clamp screws 46 and 47 are preferably threaded radially through each mass to bear upon the rod 40' and clamp the mass in any required position. By these various adjustments it will be readily seen that not only may the distance of the mass from the gyroscope casing be altered in the north-south plane but also the center of gravity thereof may be thrown slightly to one side or the other in the east-west plane so that the masses and gyroscope may be balanced in every plane with a minimum amount of adjustment.

A compass constructed according to my invention will not be disturbed in the least by swinging in any plane. The torques due to centrifugal forces, caused by the swinging in the arc of a circle, which act on the stabilized casing, vertical ring, etc., are entirely balanced by the torques due to the compensating weights 35 and 36 while the torques due to the pendulosity of the compass are eliminated by stabilizing the point of contact between the bail 21 and casing 19 by means of auxiliary gyro-pendulum 29.

While I prefer to employ a separate means, i. e. an auxiliary gyroscope 29 and compensating weights 35 and 36 to overcome torques around the vertical axis due to rolling and pitching in intercardinal planes, I am aware that it is quite possible to overcome both torques by the employment of a single compensating means. Thus the auxiliary gyro-pendulum 29 may be entirely dispensed with, provided the compensating weights are further increased in size or effect. This is rendered possible by the fact that the torque produced by both causes is in the same direction and substantially proportionate in amount so that by increasing the moment of inertia of the gyroscope and frame in the N—S plane greatly beyond that of the same in the E—W plane, the necessity for the floating connection between the pendulous bail 21 and the gyro casing 19 is largely dispensed with.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a gyroscopic compass, a rotor, a rotor bearing casing, a frame for supporting the same for oscillation about a horizontal axis, said casing being normally stabilized about said axis by the gyroscopic action of the rotor, and masses secured to said frame and positioned on opposite sides of said casing in the N—S direction for increasing the moments of inertia in the N—S plane above that in the E—W plane when the rotor is not running to compensate for the stabilized casing.

2. In a gyroscopic compass, the combination with the gyro-rotor and a casing therefor, of a vertical ring in which said casing is journalled on a horizontal axis, means for mounting said ring for turning about a vertical axis, an arm secured to said ring and extending on both sides of said horizontal axis, said arm being weighted on each side of said axis.

3. In a gyroscopic compass the combination with the gyro-rotor and a casing therefor, of a vertical ring in which said casing is journalled on a horizontal axis, means for mounting said ring for turning about a vertical axis, an arm secured to said ring and extending on both sides of said horizontal axis, said arm being weighted on each side and in the horizontal plane of said axis.

4. In a gyroscopic compass, a support mounted for freedom about a plurality of horizontal axes, a gyroscope pivoted to said support about a horizontal axis and means rigidly secured to said support for equalizing the moment of the support and gyroscope while running in the N—S direction with that in the E—W direction.

5. In a gyroscopic compass, a support mounted for movement about a vertical axis, a gyroscope pivotally supported thereon and stabilized about a horizontal axis and masses secured to said support having their center of gravity in a line at right angles to said horizontal axis and in substantially the same horizontal plane for increasing the moment in the N—S plane to substantially equal that of the stabilized gyroscope and support in the E—W plane.

6. A gyroscopic compass in which the gyroscope and its supporting parts are pendulously supported characterized by providing said parts with counterbalancing means such as weights so arranged as to increase the ballistic property or moments of inertia in the N—S direction above corresponding moments in the E—W direction when the rotor is not running.

7. In a gyroscopic compass, the combination with a gyroscope and a supporting frame therefor, of compensating weights, a member supporting said weights from said frame and a mounting for said weights in said frame permitting adjustment of the centers of gravity thereof in a plurality of planes.

8. In a gyroscopic compass, the combination with a gyroscope and a supporting frame therefor, of compensating weights, a member supporting said weights from said frame, a threaded shaft rotatably mounted in said member, one of said weights being threaded thereon to one side of its center of gravity, means whereby said shaft may be clamped in any position in the member and means whereby said weight may be clamped in any position on the shaft.

9. In a gyroscopic compass, the combination with a gyroscope and a supporting frame therefor, of compensating weights, a member supporting said weights from said frame, a threaded shaft rotatably mounted in said member, one of said weights being threaded thereon to one side of its center of gravity, and means whereby said weight may be clamped in any position on the shaft.

10. In a gyroscopic compass, the combination with a gyroscope and a supporting frame therefor, of compensating weights, a member supporting said weights from said frame, a threaded shaft rotatably mounted in said member, one of said weights being threaded thereon, and means whereby said shaft may be clamped in any position in the member.

11. In a gyroscopic compass, the combination with a gyroscope and a supporting frame therefor, of compensating weights, a member supporting said weights from said frame, a shaft mounted in said member and to which one of said weights is adapted to be secured to one side of its center of gravity for adjustment either along or around the shaft.

12. In a gyroscopic compass, a support mounted for freedom about a plurality of horizontal axes, a gyroscope pivoted to said support about a horizontal axis, means secured to said support for equalizing the moment of the support and gyroscope in the N—S direction with that in the E—W direction, when running a pendulum for imparting pendulosity to the gyroscope, and means for stabilizing the point of connection between the pendulum and casing.

13. In a gyroscopic compass comprising a support mounted for oscillation about a plurality of horizontal axes, a directive gyroscope supported thereon for oscillation about a horizontal axis and turning about a vertical axis, a yielding movable connection between said gyroscope and said support, an auxiliary gyroscope supported on said directive gyroscope for stabilizing said connection, and masses secured to said support on opposite sides of the directive gyroscope for the purpose specified.

In testimony whereof I have affixed my signature.

HARRY L. TANNER.